United States Patent [19]

Cannady, Jr. et al.

[11] Patent Number: 4,599,127
[45] Date of Patent: Jul. 8, 1986

[54] PROCESS FOR PRODUCING HIGH GLOSS LAMINATES USING A VAPOR BARRIER AT EACH END OF A LAMINATE ASSEMBLY

[75] Inventors: Daniel L. Cannady, Jr., Allendale; Halbert Mungin, Varnville; Gilbert G. Berg, Hampton, all of S.C.

[73] Assignee: Westinghouse Electric Corp., Pittsburgh, Pa.

[21] Appl. No.: 607,100

[22] Filed: May 4, 1984

[51] Int. Cl.⁴ ............................................. B32B 31/00
[52] U.S. Cl. ...................................... 156/289; 156/323
[58] Field of Search ............. 156/323, 288, 289, 62.2, 156/62.8; 264/257, 258

[56] References Cited

U.S. PATENT DOCUMENTS 3,373,068 3/1968 Grosheim et al. .................. 156/289
3,700,537 10/1972 Scher .................................... 156/289

Primary Examiner—Michael Ball
Attorney, Agent, or Firm—Daniel P. Cillo

[57] ABSTRACT

A laminate assembly, containing press plates having smooth polished sides and laminate stack-up sets, for producing high gloss laminates, is molded using a vapor impermeable barrier layer positioned between stack-ups in the stack-up set next to the exterior press plates, so that during the fast heatup of that stack-up set during molding, vapor travel toward the interior of the assembly is controlled, preventing vapor buildup, and low gloss areas on certain laminates.

6 Claims, 1 Drawing Figure

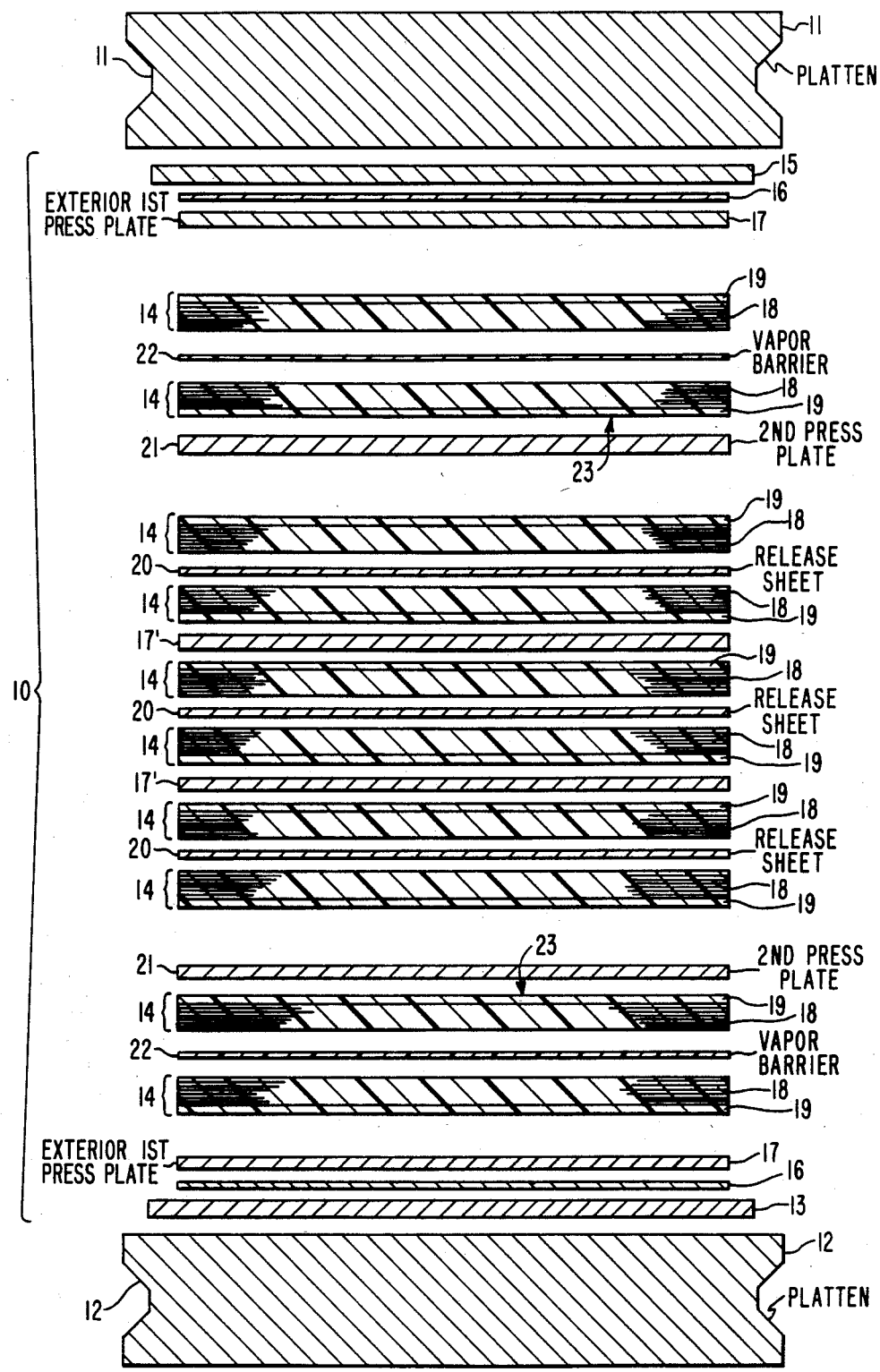

4,599,127

PROCESS FOR PRODUCING HIGH GLOSS LAMINATES USING A VAPOR BARRIER AT EACH END OF A LAMINATE ASSEMBLY

BACKGROUND OF THE INVENTION

Decorative laminates are employed in making floor surfaces, table tops, desk tops, sink tops, wall panels, and the like. These decorative laminates are usually made for flat surfaces, but can also be made postformable, as described by Palazzolo et al. in U.S. Pat. No. 3,378,433, so that, for example, sink counters with integral curved splashboards and rounded edges can be made. These decorative laminates vary in texture from deeply embossed, such as a rough slate surface, to extremely smooth, such as highly polished wood or marble surfaces. These laminates also vary in finish, from low glare, as in an embossed slate surface, having a NEMA (National Electronic Manufacturers Association) surface finish gloss rating of from about 5 to 10, to mirror finish, as in a highly polished wood or marble surface and some solid color surfaces, having a NEMA surface finish gloss rating of from about 90 to 100.

Mirror finish laminates have always been costly, and have always presented unique problems in handling and manufacture. They can be scratched easily during handling and present, among other problems, the problem of low gloss spots on a certain number of laminates, up to about 15% of each laminate assembly, during manufacture. These low gloss spots, usually called solvent areas, vary in size and shape. At times they affect areas as large as 2 foot diameter circles on 5 foot×12 foot laminates, and have plagued the industry since its inception. Such spots do not present any problems for satin, low gloss, or embossed finishes, i.e. those having a NEMA surface finish gloss rating of below about 20. If a mirror finish laminate is made having such low gloss spots, it must be scrapped, since even if it is pumice-brushed to a buff gloss finish, having a NEMA surface finish gloss rating of between about 60 to 90, the spots will still be noticeable to the customer and considered an imperfection. Mirror finished products were not in vogue for a long period of time, but in the past several years, designers and architects have been specifying an increasing amount for use in homes and commercial buildings. What has long been needed in the industry is a means to completely eliminate such solvent areas on mirror finish laminates.

SUMMARY OF THE INVENTION

The above problems have been solved and the above needs met, for laminate assemblies not containing embossing plates, which are to be finished with a NEMA surface finish gloss rating of over 60, by inserting a vapor impermeable barrier layer between the laminate stack-ups between the exterior press plates and the second press plates disposed inwardly from the hot press platens in the laminate assembly.

The prior art laminating assemblies generally comprised a steel support plate having superimposed thereon a pad sheet, a mirror finished exterior press plate, a laminate stack-up having its decorative surface facing the press plate, coated glassine paper release sheet, a laminate stack-up having its decorative surface facing away from the release sheet, an interior, second mirror finished press plate facing the decorative surface of the adjacent laminate stack-up, and so on, to include a total of about 14 laminate stack-ups per assembly or pack. Each pair of laminate stack-ups being disposed between a pair of mirror finished press plates, all disposed between heated platens of the molding press. In commercial operations, the press may contain from 9 to 30 heated platens, with separate laminate assemblies placed between them, so that in one molding operation up to about 400 separate, cured, laminate boards can be produced. In the prior art production, low gloss spots were found to occur primarily on the finished laminate surface that had been facing the interior, second mirror finish press plate disposed inwardly from each of the top and bottom heated platens, for each laminate assembly.

It has now been found, according to this invention, that substituting a vapor impermeable barrier layer, such as aluminum foil bonded to Kraft paper, for the standard vapor permeable, coated glassine paper release sheet, between the pair of laminate stack-ups between the first two press plates in from the top and bottom of each assembly, usually completely eliminated low gloss spots on any of the finished laminates. This process automatically increases production up to 15%, and eliminates the cost of discarding rejects, adding considerably to the economies of production, and allowing a lower cost per laminate, even though the vapor impermeable release layers are more expensive than the standard coated glassine paper.

BRIEF DESCRIPTION OF THE DRAWING

For a better understanding of the invention, reference may be made to the preferred embodiments exemplary of the invention, shown in the accompanying drawing, which illustrates the laminate assemblies of this invention, devoid of embossing plates, and containing a vapor impermeable barrier sheet interposed between the first pair of laminate stack-ups between the first pair of top and bottom press plates.

DESCRIPTION OF THE PREFERRED EMBODIMENTS

Referring now to the drawing, which is here very important to an understanding of the invention, one laminate assembly 10 is shown, between heatable press members, such as heatable platens 11 and 12 of the press, with interior hot water conduits not shown. In a commercial high pressure molding operation, there may be as many as 30 laminate assemblies, each between two heated platens. Bottom caul plate 13, usually a 0.25 inch (0.63 cm.) thick, ordinary cold rolled steel plate, is used as a support plate for the plurality of laminate stack-ups 14 above it in the assembly. Top caul plate 15 can be deleted from the assembly if desired. Pad paper layers are shown as 16 and can consist of 2 to 6 cellulose paper sheets, such as heavy-duty Kraft paper, or other various woven or unwoven fabrics, acting as a cushion.

Mirror finished press plates 17, 17' and 21, are specially fabricated, having an extremely smooth, highly polished finish on both sides, for plates 17' and 21, and preferably on both sides for exterior plates 17, and are about 0.125 inch (0.317 cm.) thick. These are used to provide the high gloss finish on the final laminate decorative surface. This process and assembly relates to mirror finish or buff gloss finish laminates, rather than to low gloss embossed laminates, and so, embossing plates or other types of rough surface finished plates or sheets are not appropriate anywhere in the assembly and are excluded; embossed laminates being completely different and presenting their own sets of problems.

The laminate stack-ups 14 usually consist of 2 to 10 sheets of phenolic, usually phenol-formaldehyde, or cresylic-aldehyde, or epoxy resin-impregnated Kraft or other cellulosic sheet, to provide a core layer 18. The core layer is covered by a melamine, usually melamine-formaldehyde, resin-impregnated, fine alpha cellulose or other cellulosic decorative or print sheet 19, having, for example, a plain color, wood grain, or marble decorative pattern. If a wood grain or marble pattern is used, a melamine resin-impregnated, fine alpha cellulose or other cellulosic protective overlay sheet (not shown) is generally used to cover the pattern. When a plain color decorative sheet is used, no protective overlay is needed and it may be omitted. The construction of the laminate stack-ups is well known in the art and allows for broad substitution of resins, and core, decorative, and overlay sheet materials, as described fully in U.S. Pat. No. 3,378,433. The high gloss finish is desired on the decorative side, so the decorative or print sheet 19 is placed facing the polished press plates 17, 17' and 21.

Release sheets 20 are placed between the core layer sides 18 of the laminate stack-ups 14. Usually these release sheets are made of inexpensive glassine paper or parchment paper. When glassine or other porous paper is used as sheet 22, it has been found that low gloss spots are formed on the decorative surfaces 23 of the laminate, next to the interior, second mirror finished press plates 21 disposed inwardly from the top and bottom platens 11 and 12. These low gloss spots are easily seen and can take the form of edge strips 2 inches to 4 inches wide, or circles up to 2 feet in diameter on 5 foot×12 foot laminates. It has been found that if a vapor impermeable barrier is used as layer or sheet 22, low gloss spots are eliminated. Low cost chemically treated glassine paper release sheets 20 can still be used everywhere else in the assembly, or on each side of the vapor barrier.

Thus, the useful laminate assemblies of this invention contain: exterior press plates 17 having a smooth polished finish on at least one side and interior press plates 17' and 21 having a smooth polished finish on each side, at least three laminate stack-up sets each containing two stack-ups with all decorative layers facing the smooth side of the press plates. The vapor impermeable barrier layers 22 are positioned between the stack-ups in the stack-up set disposed next to the two exterior press plates 17, and standard release sheets 20 are positioned between the stack-ups of the remaining stack-up sets. The vapor barrier 22 is effective to prevent excess vapor buildup next to the interior, second press plate side, i.e., the side of plate 21 facing the exterior press plate 17, when the laminate assembly is subject to heat and pressure in a press during lamination, causing vapor to travel toward the interior of the assembly.

Glassine paper, when used as a release sheet, is usually coated or otherwise treated with a release solution, such as a chromium complex, or the like, on one or both sides, is about 0.015 inch (0.038 cm.) thick, and costs about $0.01/sq.ft. An aluminum foil of about 0.0004 inch (0.0010 cm.) thickness, bonded to 0.003 inch (0.0076 cm.) thick paper, used as a combination release—vapor barrier sheet, costs about $0.030/sq.ft. The foil-paper barrier would preferably be used in a set, i.e., vapor barrier 22 would consist of two aluminum foil-paper sheets with the paper side of each facing the other—aluminum sides out, to provide a completely releasable combination. Using two vapor barrier sheets would provide a layer about 0.007 inch (0.017 cm.) thick, costing about $0.06/sq.ft. Obviously, in any commercial operation, such a vapor barrier, costing two times to five times more than standard release sheets and using two times to five times more space in a laminate assembly, would be disposed only where essential to solving low gloss spot problems. Even so, such vapor barrier use would present a dramatic total savings in terms of providing up to 15% increased production of high priced, high gloss laminate product.

The low gloss spots on decorative surfaces 23 have been found to occur because both of the laminate stack-ups between exterior, first press plates 17 and interior, second press plates 21 are necessarily subject to a very fast heat change in a short period of time, causing heating at a faster rate than the other interior stack-ups, being very close to heated platens 11 and 12. Vapor from the two laminate stack-ups is formed and combines under conditions not usually present elsewhere in the assembly. The vapor travels toward the interior of the assembly, and condenses at the surface in contact with the interior, second press plate 21. Further into the center of the assembly, volatile generation is thought to be slower, allowing bleeding off to the sides of the assembly, or volatile generation is minor due to a sufficient time period for the phenolic or other resin to gel and cure. Thus, usually, the low gloss spots are a localized phenomenon due to the buildup of volatiles from both stack-ups between exterior plate 17 and interior plate 21.

By inserting a suitable barrier impermeable to the vapor, one-half of the vapor is controlled, preventing excess buildup, and the low gloss spots are eliminated. On certain presses, vapor spots may occur frequently at another location in addition to the surface next to the interior second press plate. In such instances, one additional vapor barrier sheet may be appropriately employed between the two stack-ups at that location. Usual press temperatures are from about 120° C. to about 180° C. with pressure of from about 900 psi. to about 1,500 psi.

Useful vapor impermeable barrier layers include metal foil, such as, preferably, aluminum foil. Use of metal foil alone, however, presents handling problems for large size laminates. If the thickness of the metal foil is increased over about 0.003 inch (0.0076 cm.) to make them more handleable, cost becomes prohibitive, cutting significantly into total savings. Metal foil adhesively or otherwise bonded to a suitable support substrate, such as 0.0004 mil (0.0010 cm.) thick aluminum bonded to 0.003 inch (0.0076 cm.) thick Kraft paper is an excellent vapor barrier. If one sheet is used, it will release from the core of one of the two adjacent stack-ups between the press plates and be subsequently sanded off during standard core sanding operations utilized to make the core more glue adherable. Two sheets of metal foil-paper can be used with the aluminum surface of each facing the core of the adjacent stack-up, to provide a complete release, eliminating some further sanding and saving wear on the sanding brushes.

In most cases, the vapor barrier thickness should range from about 0.001 inch to about 0.03 inch (0.0025 cm. to 0.075 cm.) thick. Above or below this range could present handling, heat transfer or other production problems. Other useful vapor impermeable barrier sheets include polypropylene film about 0.0025 inch (0.0063 cm.) thick which costs about $0.05/sq.ft. and provies a complete release. Other vapor impermeable, thin, inexpensive, polymeric or resin-impregnated fibrous flexible substrates would be equally useful, and might be re-usable in some instances. Neither metal foil alone nor metal foil-paper sheets are generally re-used, similarly to standard coated glassive paper release sheets, re-use presenting more trouble and complication than the cost savings would generally be worth. However, in some instances, steel or aluminum sheet up to about 0.025 inch thick could be bonded to 0.003 inch thick paper, to provide a re-usable, if rather expensive and thick, vapor barrier.

The term "high gloss", as used throughout, is defined as a surface finish having a NEMA surface finish gloss rating (as described more fully in the Example) of over 60.

EXAMPLE

Four sample runs of mirror finish, NEMA surface finish gloss rating 95, smooth wood grain decorative laminates were made on a high pressure flat bed press, having 17 associated heated platen press members. Sixteen laminate assembly packs were used, one between each heated platen. Each laminate assembly pack contained 14 laminate stack-ups, divided into 7 sets of 2 stack-ups each, a total of 224 laminate stack-ups. Each set of stack-ups was disposed with their decorative surfaces outward, as shown in the Drawing. Each stack-up consisted of 7 core stock sheets of phenol-formaldehyde resin-impregnated Kraft paper, covered by a melamine-formaldehyde resin-impregnated wood grain patterned alpha-cellulose sheet, and protected by an outer, clear, melamine-formaldehyde resin-impregnated alpha-cellulose overlay sheet. When laminated, each stack-up would provide a 0.062 inch (0.158 cm.) thick decorative laminate. Each laminate assembly pack was somewhat similar to that in the Drawing, except that the Drawing shows 10 laminate stack-ups. The area dimensions of the stack-ups and laminates were 5 feet × 12 feet.

Within the sample 1 and 3 run laminate assembly packs, there was placed in superimposed relationship: a 0.25 inch (0.63 cm.) thick, ordinary, cold rolled steel caul support plate; 5 heavy-duty sheets of 0.014 inch (0.035 cm.) thick Kraft paper pad stock; exterior first press plate #1, consisting of a 0.125 inch (0.317 cm.) thick, specially fabricated steel sheet, highly polished to a smooth mirror finish on both sides; first laminate stack-up, made as described previously, with good grain decorative surface facing the mirror finish of the exterior first press plate; next, for sample 1, which illustrates this invention, a vapor impermeable barrier layer consisting of two sheets of aluminum foil bonded to Kraft paper, i.e., 0.0004 mil. (0.0010 cm.) thick aluminum bonded to 0.003 inch (0.0076 cm.) thick Kraft paper, with Kraft paper sides facing each other—aluminum foil sides as outside surfaces, and for sample 3, which is a comparative prior art sample, one 0.015 inch (0.038 cm.) thick sheet of glassine release paper coated on one side with a 30% solution of stearato chromic chloride in isopropanol as a release agent, with the release agent side facing the core of the first laminate stack-up; second laminate stack-up, made as described previously, with wood grained decorative surface facing away from the barrier layer or coated glassine release; interior, second press plate #2 similar to the first press plate; rest of the assembly as shown in the Drawing, with coated glassine paper disposed as release sheets between stack-ups within mirror finished press plates, until the first set of top stack-ups near the top platen, where again the aluminum Kraft paper vapor impermeable barrier layer was used in sample 1, as shown in the Drawing, whereas standard coated glassine release paper was used in sample 3 (see following detailed illustration table).

The sample 2 and 4 runs were the same as the sample 1 and 3 runs, except that a wood grain decorative stack-up was substituted for the pad stock next to the caul plate, with the wood grain side facing the polished press plate. Thus, the four sample runs contained the following laminating assembly configurations:

|  | Sample 1 | Sample 2 | Sample 3* | Sample 4* |
| --- | --- | --- | --- | --- |
|  | caul plate | caul plate | caul plate | caul plate |
|  | paper pad | stack-up | paper pad | stack-up |
|  | press plate #1 | press plate #1 | press plate #1 | press plate #1 |
|  | stack-up | stack-up | stack-up | stack-up |
| SET 1 | VAPOR BARRIER | VAPOR BARRIER | paper release | paper release |
|  | stack-up | stack-up | stack-up | stack-up |
|  | press plate #2 | press plate #2 | press plate #2 | press plate #2 |
|  | stack-up | stack-up | stack-up | stack-up |
| SET 2 | paper release | paper release | paper release | paper release |
|  | stack-up | stack-up | stack-up | stack-up |
|  | press plate #3 | press plate #3 | press plate #3 | press plate #3 |
|  | stack-up | stack-up | stack-up | stack-up |
| SET 3 | paper release | paper release | paper release | paper release |
|  | stack-up | stack-up | stack-up | stack-up |
|  | press plate #4 | press plate #4 | press plate #4 | press plate #4 |
|  | stack-up | stack-up | stack-up | stack-up |
| SET 4 | paper release | paper release | paper release | paper release |
|  | stack-up | stack-up | stack-up | stack-up |
|  | press plate #4 | press plate #4 | press plate #4 | press plate #4 |
|  | stack-up | stack-up | stack-up | stack-up |
| SET 5 | paper release | paper release | paper release | paper release |
|  | press plate #3 | press plate #3 | press plate #3 | press plate #3 |
|  | stack-up | stack-up | stack-up | stack-up |
| SET 6 | paper release | paper release | paper release | paper release |
|  | stack-up | stack-up | stack-up | stack-up |
|  | press plate #2 | press plate #2 | press plate #2 | press plate #2 |
|  | stack-up | stack-up | stack-up | stack-up |
| SET 7 | VAPOR BARRIER | VAPOR BARRIER | paper release | paper release |
|  | stack-up | stack-up | stack-up | stack-up |
|  | press plate #1 | press plate #1 | press plate #1 | press plate #1 |

| Sample 1 | Sample 2 | Sample 3* | Sample 4* |
| --- | --- | --- | --- |
| paper pad | stack-up | paper pad | stack-up |
| caul plate | caul plate | caul plate | caul plate |

*comparative sample runs

When the flat bed press was loaded with 16 of the sample assemblies described, each run was made using a 60-minute heating plus cooling cycle, with peak platen temperatures of about 132° C. (270° F.), and a pressure of about 1,200 psi. After cooling and release of the laminating assemblies by the press ram, all 14 laminates of each of the 16 laminating assembly packs were examined—a total of 224 consolidated laminates, with the following results:

Sample Run No. 1

None of the 224 decorative laminates contained observable low gloss spots on their decorative surface. All of the laminates showed a 95 to 97 NEMA 60° specular gloss surface finish rating as test measured using a photosensitive 60 degree gloss meter instrument commercially available for this test from Gardner Laboratory, Inc. made to NEMA (National Electrical Manufacturers Association) specifications. The Gardner instrument had a scale graduated from 0 to 100 units. A reading of from 4 to 20 is considered textured low gloss, a reading of from 15 to 34 is considered satin finish, a reading of 60 to 90 is considered buff high gloss, and a reading of from 90 to 100 is considered high gloss. Gloss, as determined by this test method, refers to the light which is specularly reflected, i.e., when the angle of incidence is equal to the angle of reflection. Gloss is determined by the smoothness of the surface; it describes a "mirror effect". The test procedure was in accordance with the ASTM Standards Publication, and is well known in the art.

Sample Run No. 2

None of the 256 decorative laminates contained observable low gloss spots on their decorative surface. All of the laminates showed a 95 to 97 NEMA surface finish gloss rating.

Comparative Sample Run No. 3

Here, not using vapor barrier sheets, 32 of the 224 decorative laminates (14.3%) had a variety of observable low gloss spots and other areas ranging up to 1 inch wide strips and circular areas having varying diameters of up to about 12 inches. Even after brush buffing the 32 spotted laminates with a pumice and water slurry, to bring the NEMA surface finish gloss rating down to about 70, the spots were still evident. The remaining 192 decorative laminates were fine, and showed a 95 to 97 NEMA surface finish gloss rating. The defective laminates were those positioned in each laminate assembly stack next to the #2 press plate, i.e., the interior, second mirrored press plate in from the heated platen.

Comparative Sample Run No. 4

Here, not using vapor barrier sheets, 32 of the 256 decorative laminates (12.5%) also had a variety of observable low gloss spots as in Comparative Sample Run No. 3. The remaining 224 decorative laminates were fine, and showed a 95 to 97 NEMA surface finish gloss rating. The defective laminates were those positioned in each laminate assembly stack next to the #2 press plate, i.e., the interior, second mirrored press plate in from the heated platen.

As can be seen, the results are predictable when not using a vapor barrier layer between the laminate stack-ups between the exterior and interior second press plates inwardly from the hot platens. Most of the time those decorative surfaces adjacent the interior second inward mirror press plate will have a vapor condensation problem. Use of the vapor barrier layer will completely solve the problem at that point. Use of other barrier layers, such as polypropylene provide equally outstanding results.

We claim:

1. A method of molding a laminate assembly, without the use of embossing sheets, in producing high gloss decorative laminates comprising the steps:
(1) placing a laminate assembly between heatable press members in a press, said laminate assembly comprising:
  (A) a plurality of press plates, two of which are exterior positioned press plates having a smooth polished finish on at least one side, the rest of which are interior positioned press plates having a smooth polished finish on each side,
  (B) at least three laminate stack-up sets, each stack-up set disposed between two press plates, each stack-up set containing two stack-ups, each stack-up comprising a core layer and a decorative layer, with the decorative layer of each stack-up facing the smooth side of the press plates,
  (C) a vapor impermeable barrier layer positioned between those stack-ups that are in the stack-up sets disposed next to the two exterior positioned press plates, said barrier layer positioned next to the core layer of each of those stack-ups, and
  (D) a release sheet positioned between the stack-ups of the remaining stack-up sets,
(2) applying heat and pressure to the heatable press members, during which heating, the stack-up sets disposed next to the two exterior press plates will necessarily heat up at a faster rate than the remaining stack-ups in the laminate assembly, generating vapor travel toward the interior of the assembly, where said vapor impermeable barrier layer is effective to prevent excess vapor buildup next to the interior press plate sides facing the exterior press plates, said heat and pressure consolidating the stack-ups to product high glass decorative laminates.

2. The method of claim 1, where, in each stack-up, the core layer comprises a plurality of phenolic resin-impregnated cellulosic sheets, and the decorative layer comprises a melamine resin-impregnated cellulosic sheet, and as a final step, releasing the decorative laminates, where the decorative laminates produced from the stack-up sets disposed next to the two exterior press plates are free of low gloss areas.

3. The method of claim 1, where the heat and pressure applied in step (2) are in the range of from about 120° C. to about 180° C. and from about 900 psi. to about 1,500 psi., respectively, the vapor impermeable barrier layer is a thin sheet material selected from the group consisting of metal foil, metal foil bonded to cellulosic paper, metal sheet bonded to cellulosic paper, and vapor impermeable resinous polymeric sheet, and the release sheet is release chemically treated cellulosic sheet.

4. The method of claim 1, where a plurality of laminate assemblies are placed individually between a plurality of heatable press members in a flat bed press.

5. The method of claim 1, where the decorative layer of the stack-ups is covered by a melamine resin-impregnated cellulosic sheet protective overlay layer, cushion pads are disposed between the exterior press plates and the heatable press members, and the vapor impermeable barrier layer is from about 0.001 inch to about 0.03 inch thick.

6. The method of claim 1, where all the laminates produced have a NEMA gloss rating of over 60.

* * * * *